No. 609,288. Patented Aug. 16, 1898.
L. MITCHELL.
MEANS FOR FASTENING INSULATOR PINS TO CROSS ARMS.
(Application filed May 10, 1898.)
(No Model.)
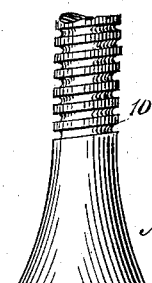
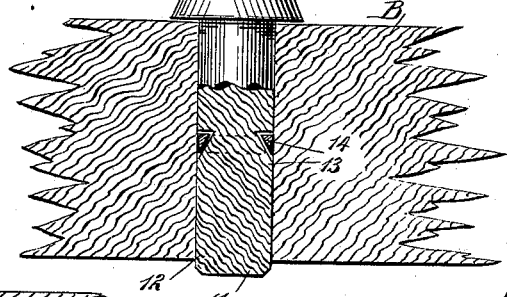
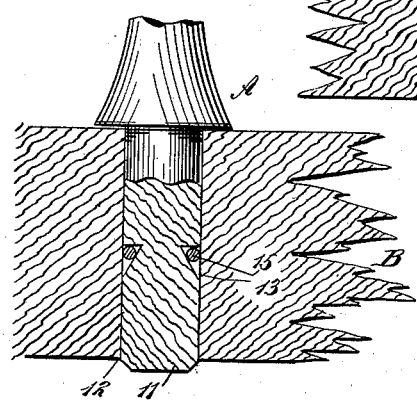
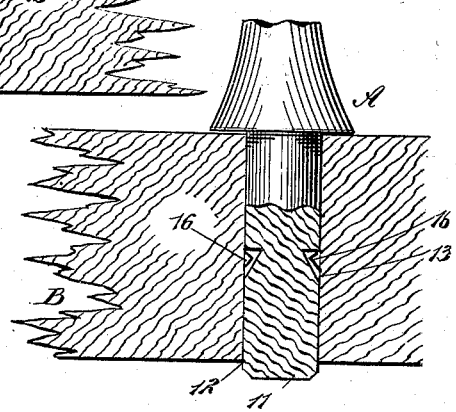
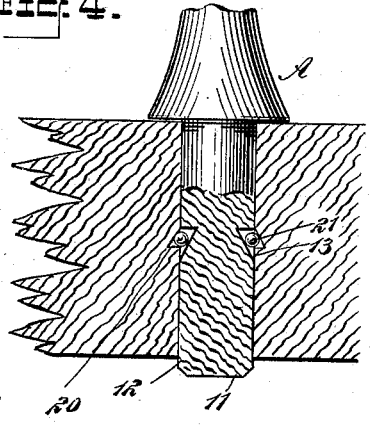
WITNESSES:
INVENTOR
L. Mitchell.
BY
ATTORNEYS.

UNITED STATES PATENT OFFICE.

LORON MITCHELL, OF AUGUSTA, GEORGIA.

MEANS FOR FASTENING INSULATOR-PINS TO CROSS-ARMS.

SPECIFICATION forming part of Letters Patent No. 609,288, dated August 16, 1898.

Application filed May 10, 1898. Serial No. 680,292. (No model.)

*To all whom it may concern:*

Be it known that I, LORON MITCHELL, of Augusta, in the county of Richmond and State of Georgia, have invented a new and Improved Means for Fastening Insulator-Pins to Cross-Arms, of which the following is a full, clear, and exact description.

The object of my invention is to provide a means for simply and durably securing insulator-pins to cross-arms, the means being of such a character that a pin may be conveniently and expeditiously placed in position in the cross-arm, and the pin when once placed in position cannot be withdrawn without especial endeavor.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a partial side elevation and partial sectional view of the insulator-pin and a section through the cross-arm to which the pin is applied, also a section through the device for securing the pin to the cross-arm. Fig. 2 is a view similar to Fig. 1, illustrating a slight departure from the construction shown in Fig. 1 with reference to the fastening device. Fig. 3 is likewise a view similar to Fig. 1, illustrating another departure in the formation of the fastening device; and Fig. 4 is a partial side elevation and partial sectional view of the insulator-pin and a section through the cross-arm to which the pin is applied, illustrating another slight departure from the form of fastening device shown in Fig. 1.

A represents an insulator-pin of the ordinary type provided with a threaded surface 10 to receive an insulator and a shank 11, adapted to enter a suitable opening 12 in the cross-arm B. The shank of the insulator-pin is provided with an annular groove 13, triangular in cross-section, the horizontal wall of the groove being the upper wall, and an open ring of a spring material is provided to enter the groove 13. This open ring may be triangular in cross-section, as shown at 14 in Fig. 1, or may be round in cross-section, as shown at 15 in Fig. 2, or the said ring, as illustrated at 16 in Fig. 3, may be of angular shape and constructed of sheet metal.

Under either construction of the ring before the insulator-pin is introduced into the cross-arm the ring is closed as tightly as possible within the annular groove 13, and the shank of the pin, with the ring so closed, is introduced into the opening 12 of the cross-arm, and when the insulator-pin has been brought to the desired position on the cross-arm the ring will be in frictional engagement with the wall of the opening into which the pin is introduced. The ring will offer little resistance to the entrance of the pin in the opening 12 of the cross-arm; but the moment that influence is exerted on the pin to remove it from the cross-arm the ring will travel down the inclined wall of the groove 13 and will serve to bind the shank so closely to the cross-arm that considerable force will be required to remove the pin from the cross-arm, which force would not be brought to bear under ordinary circumstances.

Under the construction shown in Fig. 4 the same form of recess 13 is provided as is shown in Figs. 1, 2, and 3; but a corresponding annular recess 20 is provided in the wall of the opening 12, which recess 20 is angular in cross-section, but is reversely formed to the recess in the pin. The locking device in the form of construction shown in Fig. 4 may consist of an open ring, of metal or wood, or of shot 21 or other round substance, chalk, or dirt, or, in fact, any substance that would cause the pin to tighten in the cross-arm when carried in a direction to remove it.

It is obvious that under any of the constructions shown the means employed for securing the insulator-pin to the cross-arm are simple, durable, and economic, and the said means will offer such resistance to the removal of the pin as to require the application of considerable force to effect the dislodgment of the pin.

Having thus described my invention, I claim as new and desire to secure by Letters Patent—

1. An insulator-pin having its shank provided with a groove triangular in cross-section, and a locking device carried by the said groove and adapted for frictional engagement with the wall of an opening into which the shank of the pin may be passed, substantially as shown and described.

2. An insulator-pin provided with an annular groove in its shank triangular in cross-section, and an open ring of a spring material adapted to be contained within the said groove, for the purpose set forth.

3. The combination, with a cross-arm and an insulator-pin introduced into the cross-arm, the said pin being provided with an annular groove in that portion which enters the cross-arm, of a frictional locking device held within the said groove of the pin and adapted for engagement with a wall of the opening through which the pin is passed, substantially as described.

LORON MITCHELL.

Witnesses:
T. J. WILLIS,
G. PIERCE TURNER.